(12) United States Patent
Duffin

(10) Patent No.: US 6,417,475 B1
(45) Date of Patent: Jul. 9, 2002

(54) EDM ELECTRODE POSITION DETECTION

(75) Inventor: Jason E. Duffin, Leicestershire (GB)

(73) Assignee: M J Technologies Limited, Leicestershire (GB)

( * ) Notice: Subject to any disclaimer, the term of this patent is extended or adjusted under 35 U.S.C. 154(b) by 0 days.

(21) Appl. No.: 09/575,953

(22) Filed: May 23, 2000

(30) Foreign Application Priority Data

May 24, 1999 (GB) ................................ 9912051

(51) Int. Cl.$^7$ ............................. B23H 7/18; B23H 7/32
(52) U.S. Cl. ................................ 219/69.17; 219/69.16
(58) Field of Search ......................... 219/69.17, 69.11, 219/69.16, 69.13; 205/660, 661

(56) References Cited

U.S. PATENT DOCUMENTS

| | | | |
|---|---|---|---|
| 3,651,505 A | * 3/1972 | Schmidt | 324/662 |
| 4,188,522 A | 2/1980 | Baker | |
| 4,725,705 A | * 2/1988 | Holland-Moritz et al. | 219/69.1 |
| 5,095,635 A | 3/1992 | Iwasaki | |
| 5,224,048 A | * 6/1993 | Ohba et al. | |
| 5,339,249 A | * 8/1994 | Schaeffer | 700/176 |
| 5,358,364 A | * 10/1994 | Kall | 33/638 |
| 5,418,345 A | * 5/1995 | Adamski | |
| 6,127,642 A | * 10/2000 | Gleason et al. | |
| 6,150,627 A | * 11/2000 | Sugiyama | |
| 6,208,150 B1 | * 3/2001 | Akamatsu | |
| 6,310,312 B1 | * 10/2001 | Higuerey et al. | 219/69.11 |

FOREIGN PATENT DOCUMENTS

| | | |
|---|---|---|
| JP | 60085830 | 5/1985 |
| JP | 2167626 | 6/1990 |
| JP | 03131427 | 6/1991 |
| JP | 04082666 | 3/1992 |
| JP | 7068420 | 3/1995 |
| JP | 10118849 | 5/1998 |

* cited by examiner

Primary Examiner—Tom Dunn
Assistant Examiner—Colleen P. Cooke
(74) Attorney, Agent, or Firm—Buchanan Ingersoll, P.C.

(57) ABSTRACT

The invention provides an apparatus and method for detecting an out-of-line electrode prior to the start of an electrical discharge machining (EDM) process. The invention involves positioning an electrically conductive test component in an accurately defined location relative to a workpiece. The test component has a test hole of a size and shape corresponding to the hole to be drilled in the workpiece by an electrode of an EDM machine. The electrode is then inserted into the test hole. If the electrode is correctly aligned then it will not contact the test component and no electrically conductive path will be formed between the electrode and the test component. If such contact is detected then the electrode is misaligned and the EDM process is stopped. This sequence is repeated immediately before the commencement of drilling of each hole in the workpiece.

8 Claims, 2 Drawing Sheets

EDM ELECTRODE POSITION DETECTION

BACKGROUND ART

1. Field of the Invention

The invention relates to the field of precision electrical discharge machining (EDM) of metal components, and provides a method and apparatus for confirming the continued accurate positioning of one or more electrodes on an EDM machining head and for detecting out of position or misaligned electrodes.

2. Description of the Related Art

In EDM an electrode, or a number of electrodes carried on a machining head, is moved into close proximity to a metal or other electrically conductive workpiece, and a series of electrical sparks or discharges generated between the or each electrode and the workpiece. The material of the workpiece is vaporized, and by advancing the machining head a hole or holes can accurately be machined into the workpiece. The shape of the hole is dictated by the shape of the electrode. For example a round wire electrode will create a hole of circular section. A metal strip electrode of curved or arcuate section will create a slot-shaped hole of corresponding curved or arcuate section. The only practical limit is presented by the shape of the electrode.

EDM machining is used for the very high precision creation of multiple holes in workpieces. For example the blades and vanes of jet engine turbines may be machined by this method. Such components are provided with multiple air holes through which cooling air passes when the component is used in a jet engine. The cooling air flow is critical, since without it the component would deform or even melt at the temperatures established in a jet engine in use. To that end the size shape and angular orientation of each air hole is specified within close tolerances. Each blade or vane may have tens or hundreds of air holes machined in it before it can be used, and different air holes in the same component frequently have different specifications to ensure the proper operation of the component in use. The angular orientation is controlled by having the machining head carried on a numerically controlled robot arm having at least three degrees of freedom of movement.

A problem which has long been experienced in EDM fabrication of components has been the high cost of quality control and of rejection of inaccurately machined components. The entire machining process is carried out under computer control and in theory should therefore be consistent and accurately reproducible. With that automation and computer control, however, comes an inevitable loss of continuous visual inspection of the workpiece during machining. The machining takes place in a closed cabinet, and when it is complete the workpiece must be checked for the total accuracy of the drilling.

A very common cause of drilling inaccuracies is the deformation of the EDM electrode or electrodes. If that electrode is a fine wire of diameter 0.2 to 0.5 mm, for example, it may easily become bent in use so that its axis is no longer aligned with the machining head axis. Even a small bend will mean that the robot arm places the tip of the wire electrode in marginally the wrong starting position on the workpiece for the commencement of a machining operation, but as the machining progresses and the hole is formed deeper into the workpiece, so the electrical discharge extends along one side of the electrode which is no longer advanced along its own axis. The result is a machined hole that is both misaligned and deformed. Users are currently discarding, during the quality control inspection, components worth £1000 or more.

BRIEF DESCRIPTION OF THE DRAWINGS

In the detailed description of the invention presented below, reference is made to the accompanying drawings, in which.

DETAILED DESCRIPTION OF THE INVENTION

The invention provides a method for detecting an out-of-line electrode prior to the start of an EDM process, which comprises positioning, next to a workpiece in a numerically controlled EDM apparatus, an electrically conductive test component in an accurately defined location relative to the workpiece, the test component having at least one reference hole formed therein of a size and shape corresponding to the size and shape of a hole intended to be drilled in the workpiece by an electrode of the EDM machine; moving the EDM machine head under numerical control prior to commencement of EDM machining to present. the electrode to the reference hole; advancing the EDM machine head to insert the electrode into the reference hole; and monitoring the creation or otherwise of an electrically conductive path between the test component and the electrode so as to detect any contact between them. If the electrode is correctly aligned with the machine head it will not contact the test component. If such contact is detected, then that is indicative of a misaligned electrode and the EDM machining process may be stopped to permit electrode realignment or replacement.

By repeating the above test sequence immediately before the commencement of drilling of each hole, it can be ensured that at the end of the EDM machining sequence all holes are correctly placed, sized and aligned. The repeated test sequence adds to the time taken by the EDM machining cycle, but is very cost-effective insofar as it substantially eliminates the need to discard substandard components resulting from electrode misalignment errors. For the majority of components it also eliminates the need for rigorous quality control checking.

Figure 1:
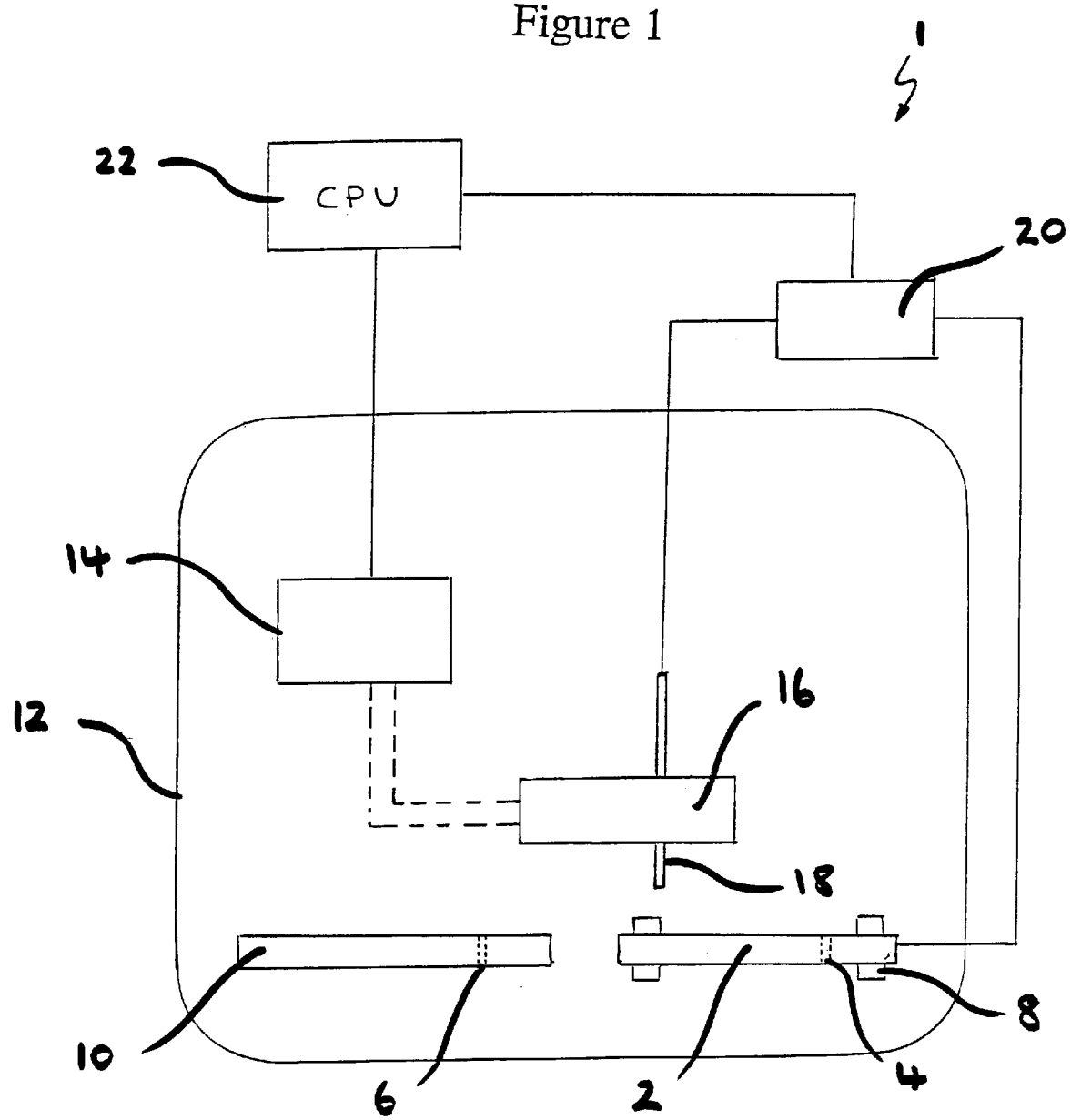
FIG. 1 is a top plan view of an EDM apparatus in accordance with the invention.

Referring to FIG. 1, the invention also provides an EDM apparatus 1 for carrying out the above process, which comprises a test component 2 having a reference hole 4 formed therein having a size and shape corresponding to a hole 6 to be drilled by the EDM apparatus 1; means 8 for securing the test component 2 in an accurately positioned location adjacent a workpiece 10 on a fixed table 12 of the EDM apparatus 1; means 14 controlling the movement of a machining head 16 of the EDM apparatus 1 to present an electrode 18 of the machining head 16 to the reference hole 4 and advancing the electrode 18 into the reference hole 4; and means 20 for detecting any electrical contact between the electrode 18 and the test component 2 and for disabling the EDM apparatus 1 whenever such contact is sensed.

The means 14 controls the movement of the machining head 16 under the numerical control of a central processing unit (CPU) 22.

Figure 2:
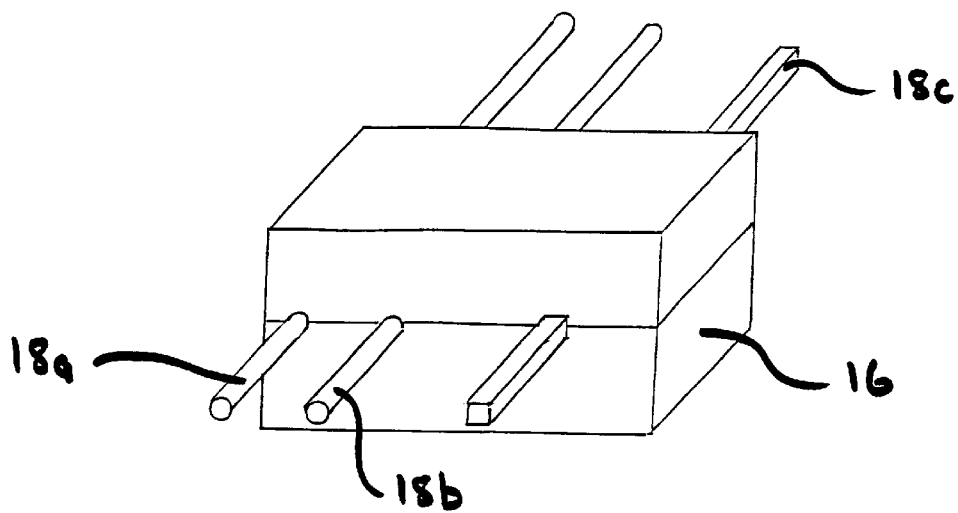
FIG. 2 is a perspective view of an EDM machine head and EDM electrodes which form part of the EDM apparatus of FIG. 1.
Figure 3:
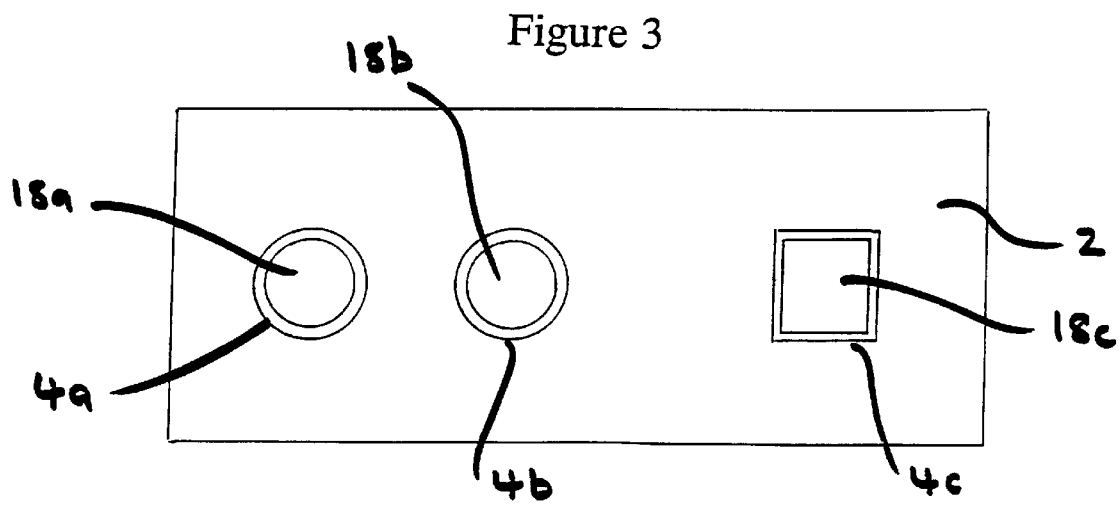
FIG. 3 is a front view of a test piece which forms part of the EDM apparatus of FIG. 1 and into which the aligned EDM electrodes of FIG. 2 are inserted.

Referring to FIGS. 2 and 3, the EDM apparatus can have a machining head 16 with multiple electrodes 18a, 18b and 18c. In this case the test component 2 is suitably formed with multiple reference holes 4a, 4b and 4c in the same pattern as the electrodes 18a, 18b and 18c. The electrodes can also be non-circular in section as shown by electrode 18c which is rectangular in section, and the test component 2 is also suitably formed with a similarly shaped reference hole 4c.

Figure 4:
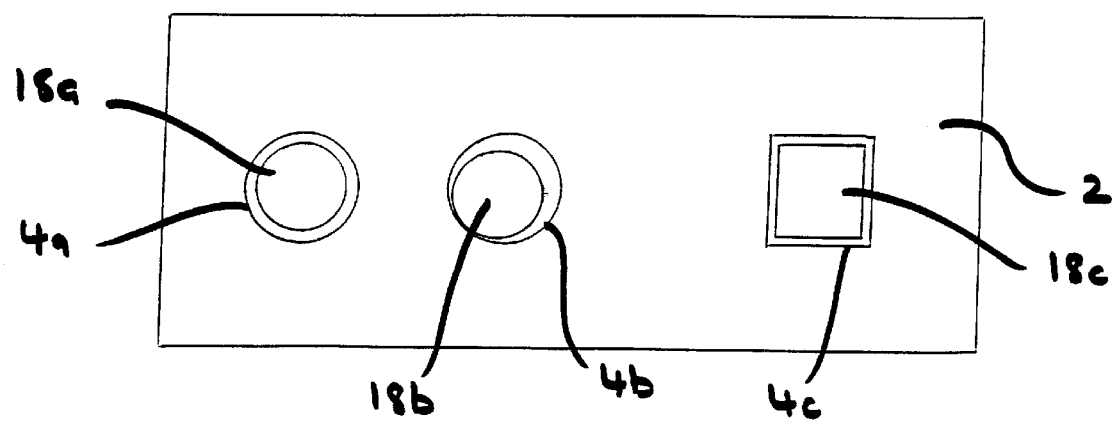
FIG. 4 is a front view of the test piece of FIG. 3 into which misaligned EDM electrodes are inserted.

Referring now to FIGS. 3 and 4, the electrodes 18a, 18b and 18c are shown inserted into reference holes 4a, 4b and 4c. In FIG. 3 the electrodes 18a, 18b and 18c are all aligned and there is no electrical contact between the electrodes 18a, 18b and 18c and the test component 2. However, in FIG. 4 one of the electrodes 18b is misaligned and consequently there is electrical contact between the electrode 18b and the test component 2. This electrical contact would be detected by the detecting means 20 and the EDM apparatus 7 would be disabled.

While specific embodiments of the invention have been described in detail, it will be appreciated by those skilled in the art that various modifications and alternatives to those details could be developed in light of the overall teachings of the disclosure. Accordingly, the particular method and apparatus disclosed herein are intended to be illustrative only and not limiting to the scope of the invention which should be awarded the full breadth of the following claims and any and all embodiments thereof.

What is claimed is:

1. A method for detecting an out-of-line electrode prior to the start of an EDM process, which comprises the steps of:
   positioning, next to a workpiece in a numerically controlled EDM apparatus, an electrically conductive test component in an accurately defined location relative to the workpiece, the test component having at least one reference hole formed therein of a size and shape corresponding to the size and shape of a hole intended to be drilled in the workpiece by an electrode of the EDM machine;
   moving the EDM machine head under numerical control prior to commencement of EDM machining to present the electrode to the reference hole;
   advancing the EDM machine head to insert the electrode into the reference hole; and
   monitoring the creation or otherwise of an electrically conductive path between the test component and the electrode so as to detect any contact between them.

2. A method of detecting an out-of-line electrode during the operation of an EDM process involving the EDM drilling of a number of holes in a workpiece, which method comprises repeating the test sequence according to claim 1 before the commencement of drilling of each hole.

3. An apparatus for carrying out the method of claim 1, which comprises:
   a test component having a reference hole formed therein having a size and shape corresponding to a hole to be drilled by an EDM apparatus;
   means for securing the test component in an accurately positioned location adjacent a workpiece on a fixed table of the EDM apparatus;
   means controlling the movement of a machining head of the EDM apparatus to present an electrode of the machining head to the reference hole and advancing the electrode into the reference hole; and
   means for detecting any electrical contact between the electrode and the test component and for disabling the EDM apparatus whenever such contact is sensed.

4. An apparatus according to claim 3 for use with an EDM machine with a machining head with multiple electrodes, wherein the test component is formed with multiple reference holes in the same pattern as the electrodes.

5. An apparatus according to claim 3 for use with an EDM machine having at least one EDM electrode which is non-circular in section, wherein the test component is formed with a similarly shaped reference hole or holes.

6. An apparatus for carrying out the method of claim 2, which comprises:
   a test component having a reference hole formed therein having a size and shape corresponding to a hole to be drilled by an EDM apparatus;
   means for securing the test component in an accurately positioned location adjacent a workpiece on a fixed table of the EDM apparatus;
   means controlling the movement of a machining head of the EDM apparatus to present an electrode of the machining head to the reference hole and advancing the electrode into the reference hole; and
   means for detecting any electrical contact between the electrode and the test component and for disabling the EDM apparatus whenever such contact is sensed.

7. An apparatus according to claim 6 for use with an EDM machine with a machining head with multiple electrodes, wherein the test component is formed with multiple reference holes in the same pattern as the electrodes.

8. An apparatus according to claim 6 for use with an EDM machine having at least one EDM electrode which is non-circular in section, wherein the test component is formed with a similarly shaped reference hole or holes.

* * * * *